(12) United States Patent
Kailash et al.

(10) Patent No.: US 9,154,475 B1
(45) Date of Patent: Oct. 6, 2015

(54) USER AUTHENTICATION AND AUTHORIZATION IN DISTRIBUTED SECURITY SYSTEM

(75) Inventors: Kailash Kailash, San Jose, CA (US); Jeff Forristal, Elizabethton, TN (US); Narinder Paul, Sunnyvale, CA (US); Sivaprasad Udupa, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 1402 days.

(21) Appl. No.: 12/354,900

(22) Filed: Jan. 16, 2009

(51) Int. Cl.
*G06F 7/04* (2006.01)
*H04L 9/32* (2006.01)
*G06F 21/00* (2013.01)
*H04L 29/06* (2006.01)

(52) U.S. Cl.
CPC ............... *H04L 63/08* (2013.01); *H04L 63/083* (2013.01)

(58) Field of Classification Search
CPC ... H04L 63/08; H04L 63/0815; H04L 63/083; G06F 21/31
USPC ........................ 726/4, 5, 8; 713/168, 170, 183
See application file for complete search history.

(56) References Cited

U.S. PATENT DOCUMENTS

| | | | |
|---|---|---|---|
| 6,779,118 B1 | 8/2004 | Ikudome et al. | |
| 2005/0268107 A1* | 12/2005 | Harris et al. | 713/182 |
| 2008/0320150 A1* | 12/2008 | Boehringer et al. | 709/228 |
| 2009/0271621 A1* | 10/2009 | Mendelovich et al. | 713/168 |
| 2010/0037046 A1* | 2/2010 | Ferg et al. | 713/155 |
| 2010/0037301 A1* | 2/2010 | Jones | 726/5 |
| 2010/0043065 A1* | 2/2010 | Bray et al. | 726/8 |

* cited by examiner

*Primary Examiner* — Arvind Moorthy
(74) *Attorney, Agent, or Firm* — Clements Bernard PLLC; Lawrence A. Baratta, Jr.; Christopher L. Bernard (57) ABSTRACT

Methods, systems, and apparatus, including computer program products, for distributed security system authorization. Client device authentication instructions are executed on a client device to determine if authentication data accessible by the client device authentication instructions are stored at the client device. If the authentication data are stored at the client device, the client device authentication instructions generate authenticated user data and store the authenticated user data at the client device. If the authentication data are not stored at the client device, the client device authentication instructions generate a login environment that allows a user of the client device to input login data. The login data are provided to a verification process that in response to verification provide the authentication data to the client device.

20 Claims, 5 Drawing Sheets

USER AUTHENTICATION AND AUTHORIZATION IN DISTRIBUTED SECURITY SYSTEM

BACKGROUND

This disclosure relates to security provisioning.

The prevalence and accessibility of computer networks requires security measures to protect valuable information. An enterprise that implements the security system can require a user to be authenticated and authorized before using the network.

One way of tracking an authentication status of a client device is to use cookies. Cookies allow a state to be maintained in a client browser, but are limited to domains for which the cookie is defined. Additionally, cookies for a specific browser are stored in a browser specific location for the browser. Thus, if a client device has more than one browser, the authenticated state in one browser is not conveyed to the other browsers.

Additionally, to provide the cookies through the HTTP mechanism, it is necessary to create authorization cookies for every new domain that is visited by the user, and to create an initial authentication cookie. Propagation of the initial authentication cookie and the domain authorization cookies for each domain may involve a number of HTTP redirects. It is desirable to minimize the number of redirects.

SUMMARY

In general, one aspect of the subject matter described in this specification can be embodied in methods that include the actions of receiving at a processing node a request for a domain from a client device; determining at the processing node whether the request includes domain authorization data for the requested domain; in response to determining that the request for the domain includes the domain authorization data, allowing the request; in response to determining that the request for the domain does not include the domain authorization data, then: providing to the client device authentication instructions that cause the client device to perform operations comprising: determining whether the client device has authenticated user data stored in a data store associated with the client device; in response to determining that the client device has authenticated user data stored in the data store, sending the request for the domain with the authenticated user data; and in response to determining that the client device does not have authenticated user data stored in the data store: generating a login environment that allow a user of the client device to input login data; sending the login data input by the user to an authentication process and receiving authentication data in response; and storing the authentication data in the data store. Other implementations of this aspect include corresponding systems, apparatus, and computer program products.

Another aspect of the subject matter described in this specification can be embodied in methods that include the actions of determining whether the client device has authenticated user data stored in a data store associated with the client device; in response to determining that the client device has authenticated user data stored in the data store, sending a request for a domain with the authenticated user data; and in response to determining that the client device does not have authenticated user data stored in the data store: generating a login environment that allows a user of the client device to input login data; sending the login data input by the user to an authentication process and receiving authentication data in response; and storing the authentication data in the data store. Other implementations of this aspect include corresponding systems, apparatus, and computer program products.

Particular embodiments of the subject matter described in this specification can be implemented to realize one or more of the following advantages. Redirects required for security verification and authorizations are reduced. Authentication data for a user can be stored in a browser-independent format so that the user is not required to perform an authentication process each time the user uses a different browser. A login environment can be conditionally generated on the client browser and used to receive user login data and provide the user login data to an authentication process. The login environment can be conditionally generated by client device authentication instructions that are browser-independent and can be used on different types of browsers. The request to receive user login data can be conditioned on the absence of authentication data for the user being stored on the client device.

The advantages listed in the above list are optional and not exhaustive. The advantages can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
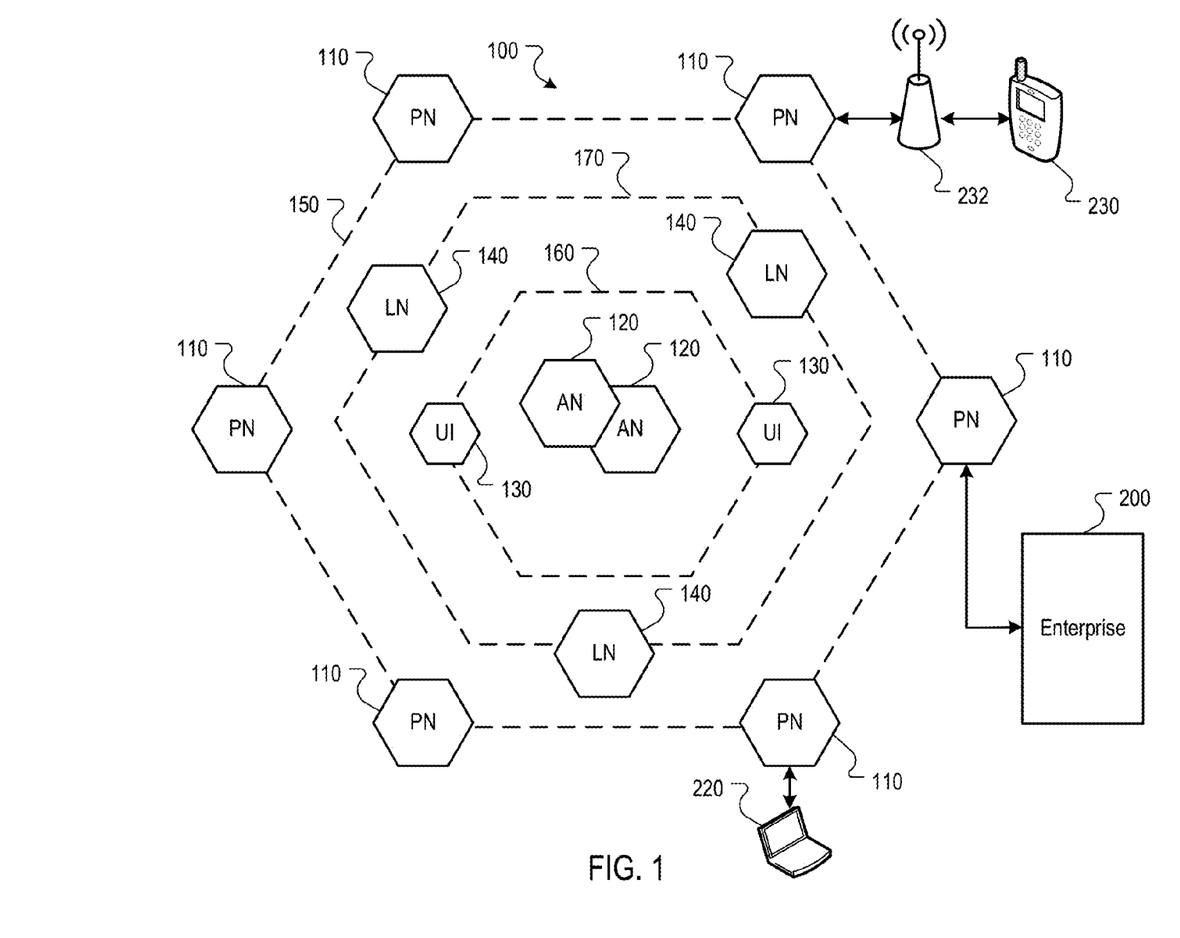
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is processed through a processing node 110.

Each processing node 110 can generate a decision vector D=[d1, d2, ..., dn] for a content item of one or more parts C=[c1, c2, ..., cm]. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested. A content item is violating if, for any part C=[c1, c2, ..., cm] of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines 119 and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols (IPSec) may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected.

In another transparent proxy mode example, a protected system, such as the enterprise 200, may identify a processing node 110 as a next hop router for communication with the external servers.

In another transparent proxy mode, a protected system such as the enterprise 200 may insert LSR (Loose Source Routes) routes into the IP options to direct traffic through the processing nodes. LSR indicates the intermediate route nodes to be visited to reach the destination using the IP options header, and thus LSR facilitates the reduction in additional header overhead of encapsulation.

§2.0 Example Detailed System Architecture And Operation

Figure 2:
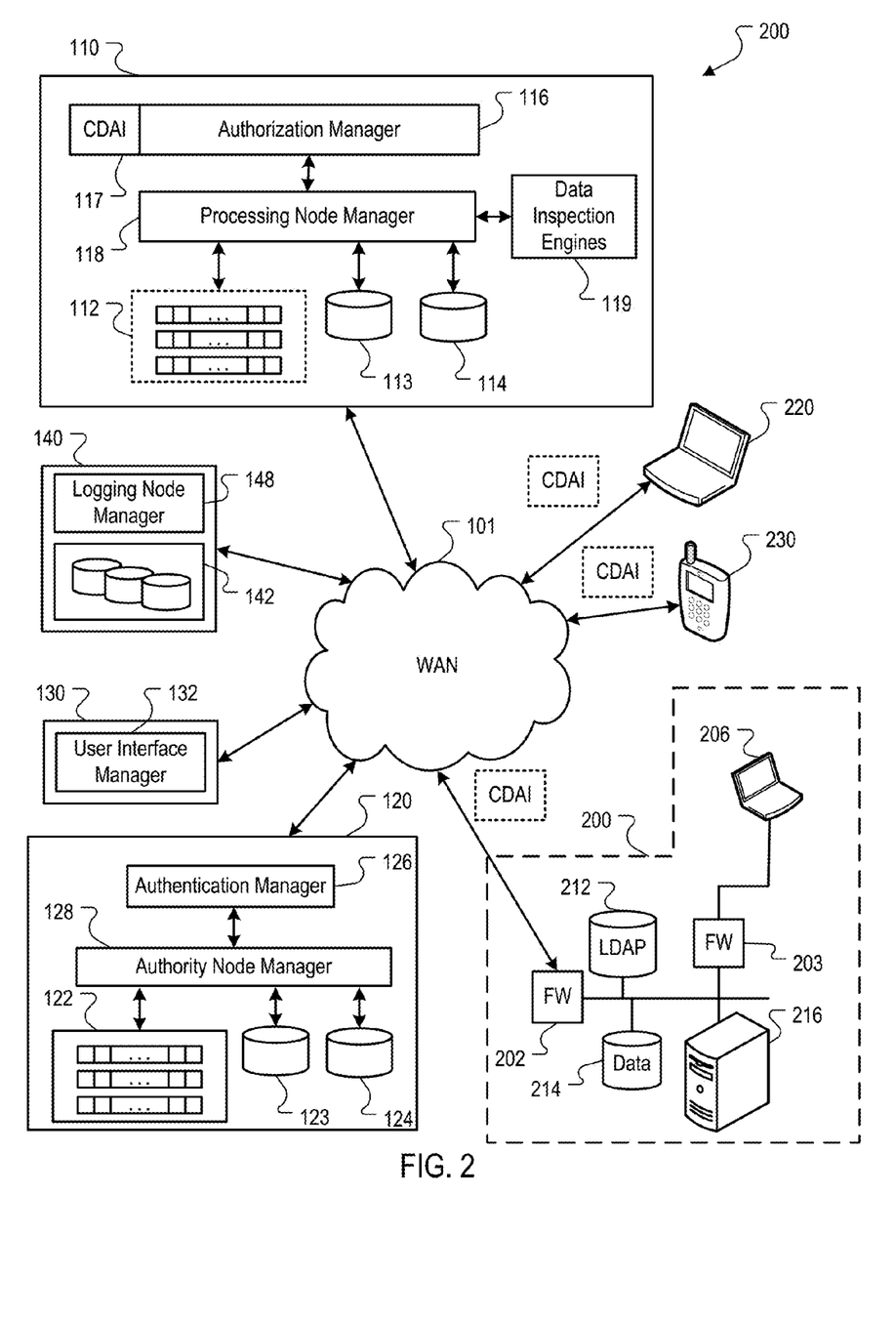
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers.

Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

The computer device 220 and the mobile device 230 can also store information warranting security measures, such as personal bank records, medical information, and login information, e.g., login information to the server 216 of the enterprise 200, or to some other secured data provider server.

§2.1 Example Processing Node Architecture

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also store a detection process filter 112 and/or threat data 114 to facilitate the decision of whether a content item should be processed for threat detection.

A processing node manager 118 can manage each content item in accordance with the security policy data 113, and the detection process filter 112 and/or threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system 100, can be threat detected to classify the content item according to threat classifications.

The processing node 110 can include data inspection engines 119. The data inspection engines 119 can be configured to perform a threat detection process to classify content items according to a threat classification for a corresponding threat. For example, the data inspection engines 119 can include a virus scanner engine that can classify a content item as infected or clean, a network URL filter that can classify a URL address as allowed or restricted, a data leakage protection (DLP) engine that can identify a content item as secure or leaking, and a dynamic content categorization engine that can classify a content item as passed or failed. Other data inspection engines can also be used.

Because the amount of data being processed by the processing nodes 110 can be substantial, the detection processing filter 112 can be used as the first stage of an information lookup procedure. Each content item can have an information key that is hashed to generate an index in the detection processing filter 112. For example, the processing node manager 118 may identify the URL address of a URL request as the information key and hash the URL address. The use of the detection processing filter 112 can improve the failure query (i.e., responding to a request for absent information) performance of database queries and/or any general information queries. In particular, the detection processing filter 112 can improve performance of queries where the answer to a request for information is usually negative. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information.

In some implementations, the processing node 110 can include an authorization manager 116. The authorization manager 116 can provide client device authentication instructions 117 to the devices 206, 220, and 230 to manage the authentication and the authorization states of users that submit requests to the processing node 110. Maintenance of the states through the authorization manager 116 by use of the client device authentication instructions 117 can minimize the number of authentication and authorization transactions that are necessary to process a request.

§2.2 Example Authority Node Architecture

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store a master detection process filter 122. The detection processing filter 122 can include data indicating whether content items have been processed by one or more of the data inspection engines 116 in any of the processing nodes 110. The authority node manager 128 can be used to manage the master detection processing filter 122, e.g., receive updates from a processing nodes 110 when a processing node 110 has processed a content item and update the master detection processing filter 122. In some implementations, the master detection processing filter 122 can be distributed to the processing nodes 110, which then store a local copy of the detection processing filter 112.

The authority node 120 can also store master threat data 124. The master threat data 124 can classify content items by threat classifications, e.g., a list of known viruses, a list of known malware sites, spam e-mail domains, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

The authority node 120 also includes an authentication manager 126. The authentication manager 126 is used to generate authentication data associated with a user identifier. The authentication data is used to generate authenticated user data for a corresponding user, and to generate domain authorization data for the user. These processes are described in more detail below.

§3.0 Authentication And Authorization Management

A request to the processing node 110 is processed by the authorization manager 116 based on the level of authentication and/or authorization the user has obtained. Authentication refers to the validation of the identity of the user. User credentials can be used to validate the identity of a user. For example, a user may be authenticated by supplying a user name and password.

Authorization refers to the eligibility of a validated user to complete an action. For example, an authenticated user may be eligible to request content from domains that provide informational content, but not from domains associated with file sharing. Thus, the user is authorized for the domains associated with provision of informational content, but not for the domains associated with file sharing.

A user is first authenticated, and is then authorized for certain actions, depending on the user's privileges as defined in the security policy data 113. As described below, the user is first authenticated, and then is authorized to perform actions on a per-domain basis. Each request from a client device is provided to the processing node 110. With each request from a client device, a browser running on the client device can provide domain authorization data or authenticated user data.

The domain authorization data are data that indicate that the user is authorized to send requests to and receive responses from a particular domain. In some implementations, the domain authorization data for particular domains are stored in the form of cookies for that particular domain. Accordingly, each outgoing browser request will include the cookie related to the domain specified by the request, and can be processed by the authorization manager 116 in the processing node 110.

The authenticated user data are data that indicate that the user of the client device has been authenticated by the authentication manager 126. The authenticated user data are used to create domain authorization data for an authenticated user.

In some implementations, the authentication state of the user for a client device is maintained in a browser-independent manner by use of the client device authentication instructions 117, which are executable by a plurality of different browser types. Example implementations of client device authentication instructions 117 include Java scripts, applets, and other instruction types that can define a program or process that instantiates in the context of another program, such as a Web browser. In the example description below, the client device authentication instructions 117 are realized by use of a flash object, i.e., a Shockwave Flash (.swf) file. The flash object is executed by a shared flash player that can be used in a plurality of different types of web browsers. In other implementations, the client device authentication instructions 117 can comprise a standalone application that runs independent of a browser environment and optionally can control the browser during the login process.

The client device authentication instructions 117 are used to obtain and/or process authentication data for the user of the client device. In some implementations, the authentication data are likewise browser-independent data. For example, the authentication data can be a flash local shared object (LSO), also known as a "Flash cookie", that is stored on the client device and is accessible by the flash player.

The client device authentication instructions 117 are provided to a client device in response to a request from the client device either not including authenticated user data or domain authorization data. Upon execution, the client device authentication instructions 117 cause the client device to determine whether authentication data for the user are stored on the client device (e.g., a data store associated with the client device). If authentication data are stored on the client device, then authenticated user data is provided to the authorization manager 116 at the processing node 110. Conversely, if authentication data are not stored on the client device, then a login environment is instantiated on the client device. The login environment allows the user of the client device to input login data, which is then provided to the authentication manager 126 in an authority node 120. The login data are processed by the authentication manager 126, and if the authentication manager 126 determines that the user has provided valid login data, the user is authenticated and authentication data are provided to the client device. The authentication data are stored on the client device and are used to generate the authenticated user data that can be provided to the authorization manager 116.

In some implementations, the authenticated user data in the authentication data can be the same data type, or even the same data. In other implementations, the authentication data and the authenticated user data can be of different data types. For example, the authentication data can be a flash local shared object, and the authenticated user data can be an HTTP cookie that is generated and stored in the browser data store for the browser that is currently being used to request to receive data.

By storing the authentication data in the browser-independent manner, the authenticated state of a user can be propagated to different browser types without requiring the user to perform a new login process in response to the user switching to a browser that was not used by the user during the authentication process.

FIGS. 3-6 provide example timing flow diagrams of processes for managing authentication and authorization as described above. The client browser 302 can be representative of any of the client devices 206, 220, or 230, in FIG. 2.

Figure 3:
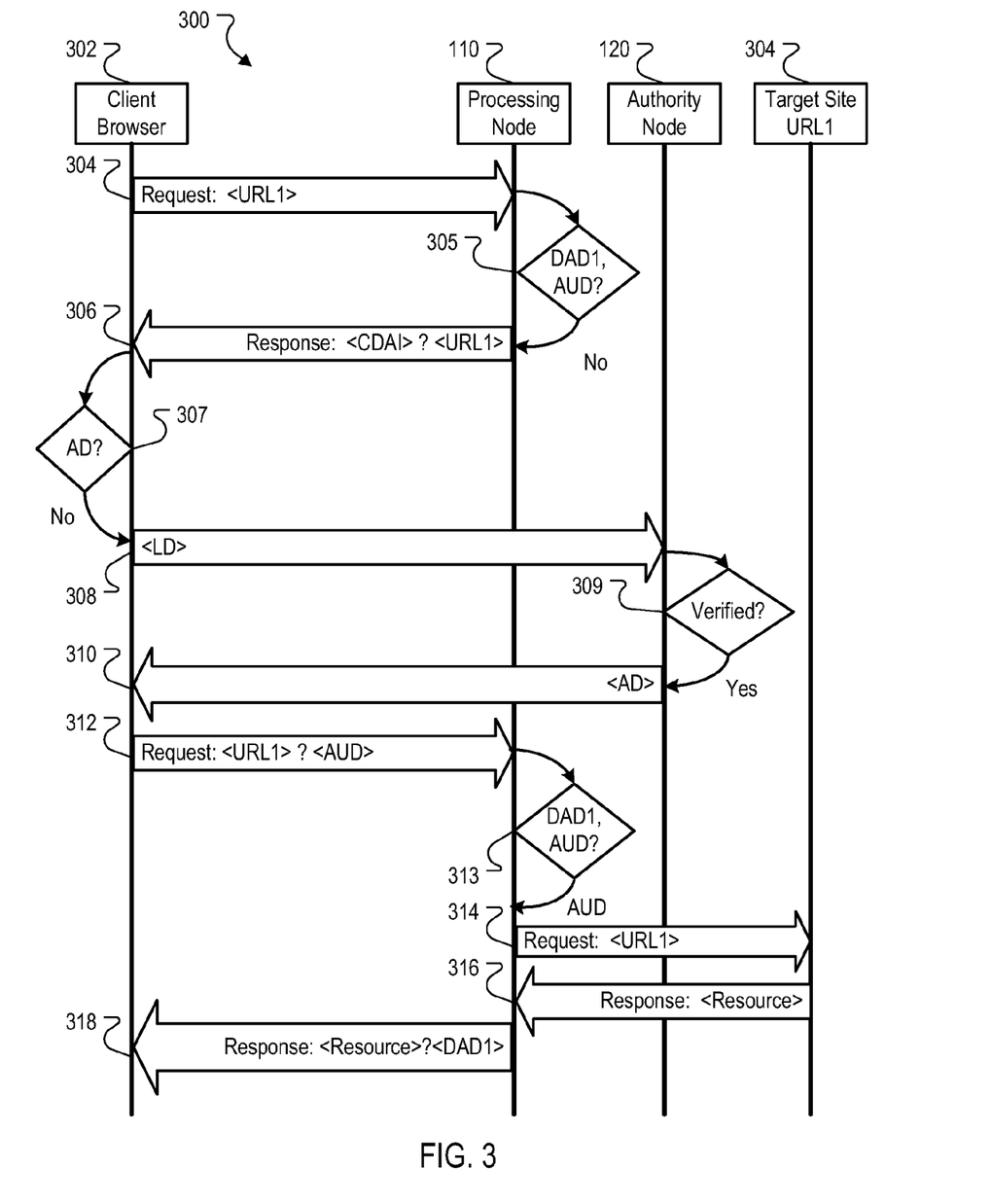
FIG. 3 is an example timing flow diagram of a process for managing requests from an unauthenticated and unauthorized user.

FIG. 3 is an example timing flow diagram of a process 300 for managing requests from an unauthenticated and unauthorized user. At a time 304, the client browser 302 issues a request for a particular resource location, e.g., an HTTP request for <URL1>, and the request is received at the processing node 110. As the user of the client browser 302 has not been authenticated, the request does not include authenticated user data <AUD> or domain authorization data <DAD1>. Example scenarios in which the user of the client device 302 is not authenticated include a new user establishing and/or verifying a user account for security services provided by the distributed security system 100, or a user that manually deleted (either intentionally or by accident) authenticated user data and authentication data that was stored on the client device running the client browser 302.

A time 305, the authorization manager 116 in the processing node 110 determines whether the request includes domain authorization data <DAD1> for the requested domain specified by the request, or authenticated user data <AUD> for the user. For example, domain authorization data for particular domain can be stored as a cookie for that domain on the client device running the client browser 302. Thus, each request by the client browser 302 that specifies a particular domain includes the cookie for that domain.

If the request received at the processing node 110 does not include a domain authorization data cookie for that domain, then the authorization manager 116 will determine whether the request includes authenticated user data <AUD> for the user. In some implementations, the authenticated user data are stored in a cookie that is associated with the domain of the processing node 110, and the authentication data for the user can be included in a redirect to the processing node 110, or by some other process.

As the request did not include either the domain authorization data <DAD1> or the authenticated user data <AUD>, the processing node 110 provides client device authentication instructions <CDAI> to the client browser 302. In some implementations, the client device authentication instructions can be in the form of a flash object that is provided to the client browser 302.

In response to receiving the client device authentication instructions <CDAI> at time 306, the client device authentication instructions are executed on the client device. For example, the flash object can be executed in the client browser 302, provided a flash player has been installed on the client device.

At time 307, the client device authentication instructions determine whether authentication data are stored on the client device. Assuming that no authentication are data store in the client device 307 (e.g., the user is not authenticated), the client device authentication instructions generate a login environment that allows the user of the client device to input login data. An example login environment can include input fields for user name and password, and an input entry button to accept the input. Example login data can include a username, such as an e-mail address, and a password. The login environment can, for example, be generated using the flash player and the client device authentication instructions.

At time 308, the login data, <LD>, is provided to the authority node 120. In response to receipt of the login data at the authority node 120, the authentication manager 126 determines whether the login data are verified at time 309. For example, the authentication manager 126 can execute an authentication process that verifies the user's e-mail and password. The password can be an initial password set by system administrator, for example, or password that the user has specified. If the login data are not verified, then the user is not authenticated and requests from the client browser 302 are blocked at the processing node 110.

If the login data are verified, then authentication data for the user e.g., <AD>, are provided to the client browser 302. In response to receipt of the authentication data at the client browser at time 310, the client device authentication instructions can generate authenticated user data, <AUD>, from the authentication data. In some implementations, the authenticated user data are stored as a cookie for the client browser 302 that is associated with the domain defined of the processing node 110.

At time 312, the client browser can resend the request to <URL1> along with the authenticated user data <AUD> to the processing node 110. In some implementations, the client device authentication instructions can cause a client browser to resend the request to the processing node 110. Resending the request can be accomplished in a variety of ways. For example, the client device authentication instructions can cause a client device to send the request for the particular resource location and include the authenticated user data as a query parameter.

In other implementations, the client device authentication instructions can cause a client device to send a request to the processing node 110 that includes the address of the original request, e.g., URL1, as a query parameter. As the request is directed to the processing node 110, the authenticated user data stored in a cookie associated with the processing node 110 is included in the request.

At the time 313, the authorization manager 116 determines that the authenticated user data <AUD> is included with the request. Accordingly, at time 314 the request is allowed to be sent to the target destination, e.g., a target site 304 hosting the resource location URL1. At time 316, a response including the requested resource is received at the processing node 110. Provided the requested resource is determined to be clean and allowed for the user, e.g., is free of viruses, malware, and the user is allowed to visit the target site 304, the processing node 110 generates domain authorization data <DAD1> corresponding to the domain of the target site. For example, the processing of 302 can generate a cookie using the domain name of the target site. The cookie can include a domain authorization data for that target site. In some implementations, the domain authorization data can include identifying data that identifies the user of the client device 302 so that the domain authorization data cannot be used by other users if the user the client device 302 provides (either intentionally or by deceit) the domain authorization data to other users.

The processing node 110 then provides the response with the domain authorization data <DAD1> to the client browser 302. The domain authorization data is then stored on the client device in the data store associated with the client browser 302, and the user is authorized to send requests for that domain. Thereafter, subsequent requests directed to the target site 304 can be processed without additional user authentication steps.

Figure 4:
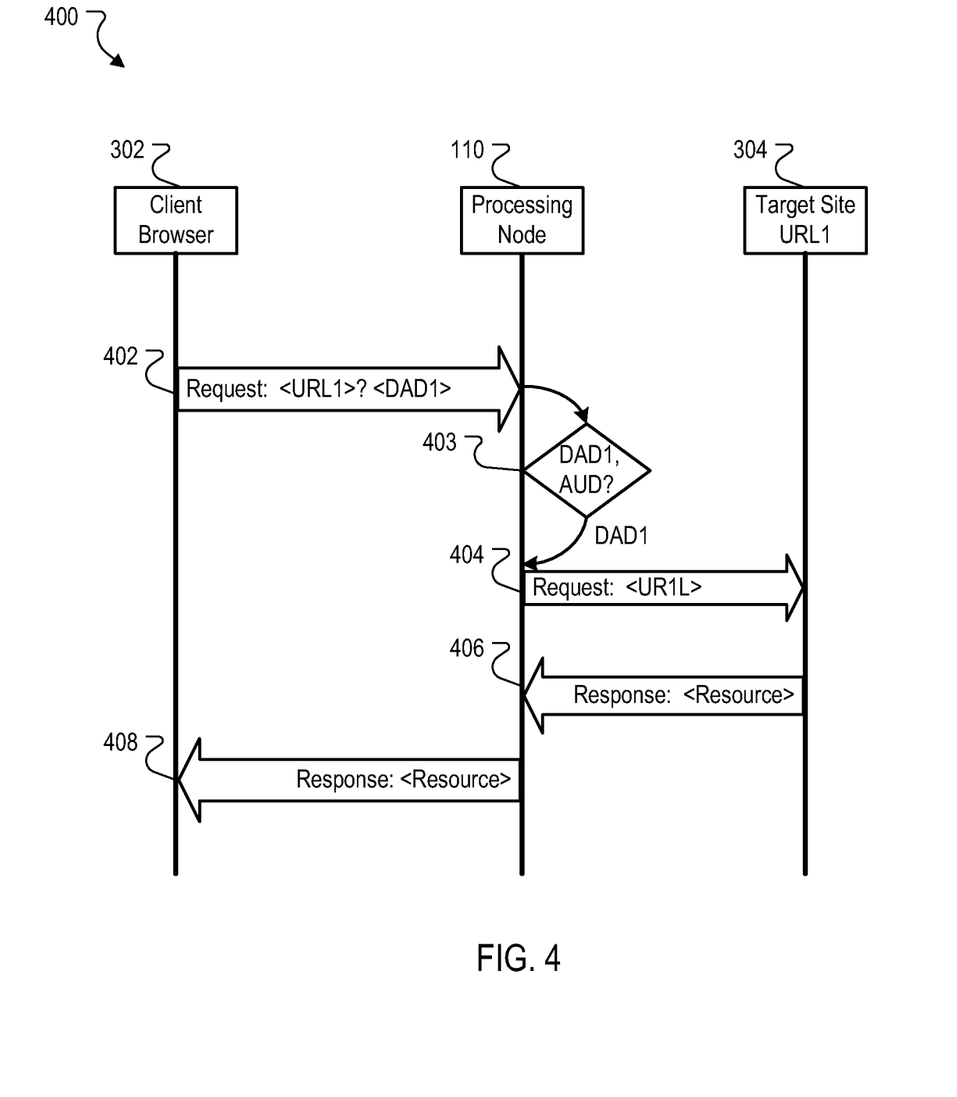
FIG. 4 is an example timing flow diagram of a process for managing a subsequent request from an authenticated and authorized user.

FIG. 4 is an example timing flow diagram of a process 400 for managing a subsequent request from an authenticated and authorized user. The process 400, for example, occurs after the process 300 has been executed.

At time 402, the client browser 302 issues a subsequent request for the resource location of the target site 304, specified by <URL1>. Because the user the client browser 302 has been previously authenticated and has been authorized to visit the domain of the target site 304, domain authorization data <DAD1> for the target site is stored on the client device and included with the request.

At time 403, the authorization manager 116 in the processing node 110 determines that domain authorization data <DAD1> for the domain of the target site is included with the request. Accordingly, at time 404, the domain authorization data is stripped from the request, e.g., if the domain authorization data is included as a query parameter, the query parameters removed from the request and the request is sent to the target site 304.

At time 406, a response including the requested resource is received at the processing node 110. Provided the requested resource is determined to be clean and allowed for the user, e.g., is free of viruses, malware, the response is provided to the client browser 302. At time 408, the response is received at the client browser 302 and processed accordingly.

Figure 5:
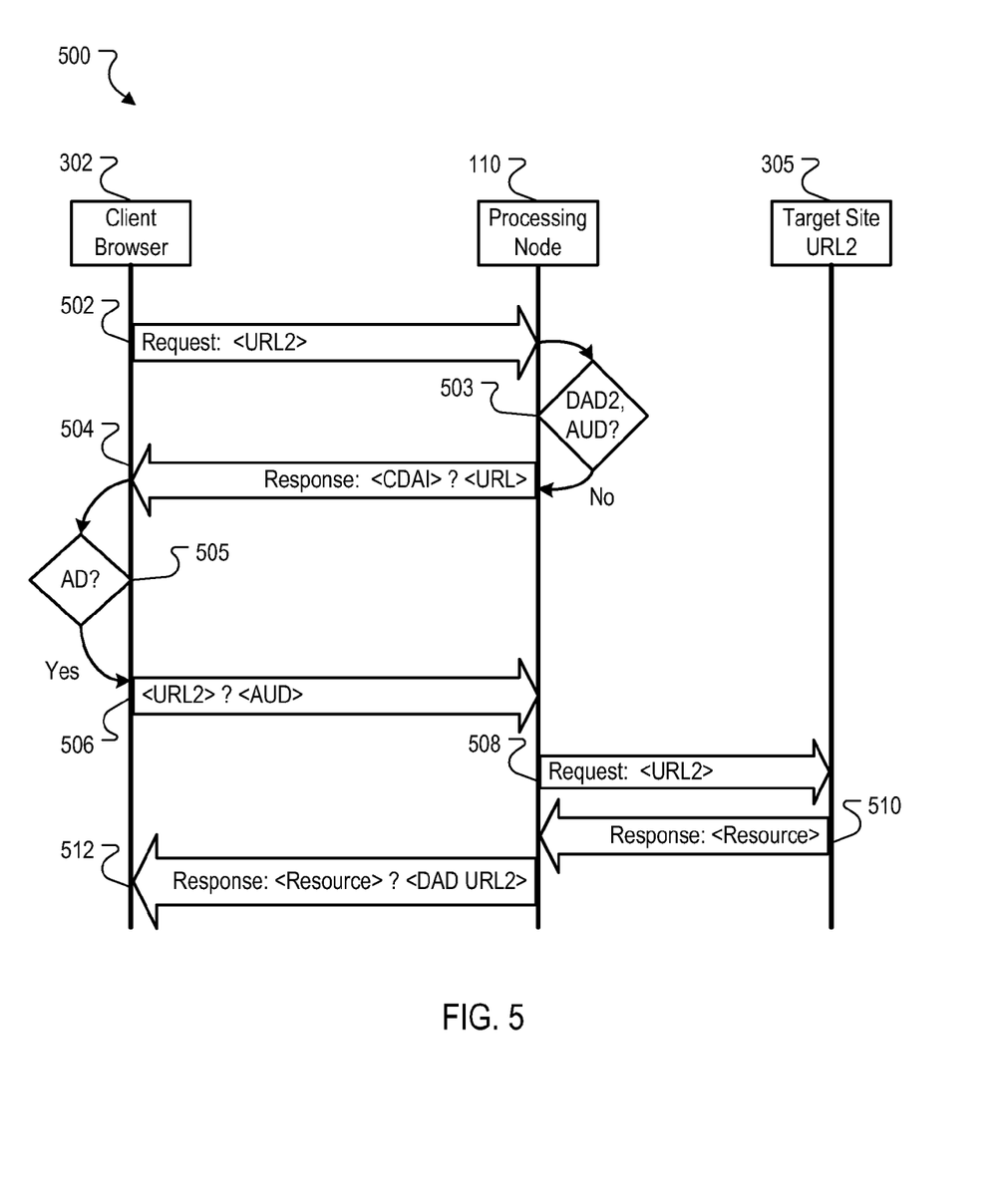
FIG. 5 is an example timing flow diagram of a process for managing a request to an unauthorized domain by an authenticated user.

FIG. 5 is an example timing flow diagram of a process 500 for managing a request to an unauthorized domain by an authenticated user. The process 500, for example, occurs after the process 300 has been executed.

The events occurring at times 502, 503, and 504 are similar to the events that occurred at times 304, 305, and 306 as described with respect to FIG. 3. However, the request is for a different domain, e.g., a target site hosting a resource location at a URL2 that specifies the domain different from the domain of the target site 304.

When the client device authentication instructions <CDAI> determine whether authentication data <AD> is stored on the client device at time 505, the client device authentication instructions identify the authentication data obtained during the authentication that occurred at time 309 in FIG. 3. Thus, at time 506, the client browser resends the request for <URL2> along with the authenticated user data <AUD> to the processing node 110.

Accordingly, at time 508 the request is allowed to be sent to the target destination, e.g., a target site 305 hosting the resource location URL2. At time 510, a response including the requested resource is received at the processing node 110. Provided the requested resource is determined to be clean and allowed for the user, e.g., is free of viruses, malware, and the user is allowed to visit the target site, the processing node 110 generates domain authorization data <DAD2> corresponding to the domain of the target site 305.

The processing node 110 then provides the response with the domain authorization data <DAD2> to the client browser 302. The domain authorization data is then stored on the client device in the data store associate with the client browser 302, and the user is authorized to send requests for that domain.

In some implementations in which the client device authentication instructions are a flash object, the authentication data provided by the authority node 120 is stored as a flash local shared object. Thus, if a user authenticated using a browser of a first type, e.g., Microsoft Internet Explorer, and the user later attempts to access a target site using a browser of a second type, e.g., Firefox, and both browsers use of flash player, then the flash local shared object can be used to generate authenticated user data for the browser of the second type. Accordingly, the user need not repeat authentication in response to using a different browser, as the client device authentication instructions and the authentication data are browser-independent.

In other implementations, the client device authentication instructions can be browser dependent. For example, the client device authentication instructions can be provided in the form of a browser plug-in tailored to specific browser types.

In still other implementations, the client device authentication instructions can be a stand-alone program that are not instantiated in the context of any other program.

The example process flows in FIGS. 3-6 are not exhaustive. For example, the provisioning of authentication data to the client device can include additional security measures. Such additional security measures include sending a link to the e-mail address provided by the user in the login environment. The user must then access the link provided in the e-mail message to receive the authenticated user data from the authentication manager 126.

In still other implementations, a system administrator can manually install a flash local shared object for the user so that a client device is pre-authorized for the user.

In some implementations, the domain authorization data is based on both the domain name of a particular site and an authenticated user data. By including a combination of these parameters in the domain authorization data, the authorization manager 116 can identify particular users associated with each request and determine whether that particular user is required to re-authenticate. Re-authentication can be scheduled on a periodic basis, e.g. weekly, monthly, or quarterly.

Embodiments of the subject matter and the functional operations described in this specification can be implemented in digital electronic circuitry, or in computer software, firmware, or hardware, including the structures disclosed in this specification and their structural equivalents, or in combinations of one or more of them. The computer readable medium can be a machine readable storage device, a machine readable storage substrate, a memory device, a composition of matter effecting a machine readable propagated signal, or a combination of one or more of them.

A computer program (also known as a program, software, software application, script, manager, processor, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows of the timing flow diagrams and structure block diagrams described in this specification, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
receiving at a processing node a request for a domain from a client device, wherein the processing node is part of a distributed security system;
determining the client device's authorization and authentication for the domain;
determining at the processing node whether the request includes domain authorization data for the requested domain, wherein the domain authorization data is indicative of eligibility of a validated user to complete an action through the processing node communicatively with one or more authority nodes;
in response to determining that the request for the domain includes the domain authorization data:
allowing the request and approving the communication of the client device through the access control of the distributed security system;
allowing distribution of the data stored through the processing node;
in response to determining that the request for the domain does not include the domain authorization data, then:
providing to the client device authentication instructions in the browser-independent instructions, that cause the client device to perform operations comprising:
determining whether the client device has authenticated user data stored in a data store associated with the client device, wherein the authenticated user data is processed as browser-independent data to generate the domain authorization data regardless of client browsers formats used;
in response to determining that the client device has authenticated user data stored in the data store, sending the request for the domain with the domain authorization data; and
in response to determining that the client device does not have authenticated user data stored in the data store:
generating a login environment that allows a user of the client device to input login data;
sending the login data input by the user to an authentication process through an authority node that is part of the distributed security system and receiving authentication data in response; and
storing the authentication data as browser-independent data in the data store, wherein the browser-independent instructions include any of Java scripts, applets, and instructions that instantiate in context of one of the different client browsers and the browser-independent data is used by the browser-independent instructions to generate the domain authorization data.

2. The computer-implemented method of claim 1, wherein the authentication instructions cause the client device to perform further operations comprising:
generating the authenticated user data from the authentication data;
resending the request for the domain with any of the different client browsers to the processing node; and
including the authenticated user data with the resent request for the domain with any of the different client browsers.

3. The computer-implemented method of claim 2, further comprising generating at the processing node the domain authorization data based on the resent request for the domain and the authenticated user data.

4. The computer-implemented method of claim 3, wherein:
the resent request is an HTTP request and the domain authorization data is included in a cookie associated with the domain, and further comprising:
receiving at the processing node a response to the resent request from a host associated with the domain; and
providing the response and the HTTP cookie that includes the domain authorization data to the client device.

5. The computer-implemented method of claim 4, wherein the browser-independent data comprise a flash object.

6. The computer-implemented method of claim 5, wherein:
the authentication data comprise a flash local shared object; and
the authenticated user data comprises an HTTP cookie.

7. The computer-implemented method of claim 4, wherein:
the client device authentication instructions are browser independent instructions executable by a plurality of different client browsers currently used to request the received data; and
the authentication data are browser independent accessible by the client device authentication instructions executed in a plurality of different client browsers currently used to request the receive data;
the authentication data are stored in the browser independently.

8. The computer-implemented method of claim 4, wherein the client device authentication instructions comprise a software component that instantiates in the context of another program running on the client device.

9. The computer-implemented method of claim 4, wherein the client device authentication instructions comprise a program that executes on the client device independent of a browser program on the client device.

10. Software stored in a computer readable medium and comprising instructions executable by a client device and upon execution cause the client device to perform operations comprising:
communicating through a processing node, wherein the processing node is part of a distributed security system and determining the client device's authorization for a domain with any of different client browsers associated with the client device;

determining whether the client device has domain authorization data, as browser-independent data, stored in a data store associated with the client device, wherein the domain authorization data is indicative of eligibility of a validated user to complete an action through the processing node communicatively with one or more authority nodes;

in response to determining that the client device has the domain authorization data stored in the data store, sending a request for a domain with the domain authorization data; and in response to determining that the client device does not have the domain authorization data stored in the data store associated to the:

generating a login environment that allows a user of the client device to input login data using browser-independent instructions;

sending the login data input by the user to an authentication process through an authority node that is part of the distributed security system and receiving authentication data in response, wherein the authentication data is used for validation of the validated user; and storing the authentication data in the data store as browser-independent data, wherein the browser-independent instructions include any of Java scripts, applets, and instructions that instantiate in context of one of different client browsers and the browser-independent data is used by the browser-independent instructions to generate the domain authorization data.

11. The software of claim 10, wherein the instructions cause the client device to perform operations comprising:

generating the authenticated user data from the authentication data; and sending the request for the domain with the authenticated user data.

12. The software of claim 11, wherein:
the request is an HTTP request; and
the domain authorization data is included in a cookie associated with the domain.

13. The software of claim 11, wherein the instructions comprise a flash object.

14. The software of claim 13, wherein:
the authentication data comprise a flash local shared object; and
the authenticated user data comprises an HTTP cookie.

15. A system, comprising:
a plurality of processing devices in a processing node configured to perform operations specified by executable instructions stored in a processing node data store, wherein the processing node is part of a distributed security system; and a processing node data store storing instructions, the instructions defining an authorization manager that upon execution cause the plurality of processing devices to perform operations comprising:

receiving a request for the domain from the client device;

determining whether the request includes domain authorization data for the requested domain, wherein the domain authorization data is indicative of eligibility of a validated user to complete an action through the processing node communicatively with one or more authority nodes;

in response to determining that the request for the domain includes the domain authorization data, allowing the request;

approving the communication of the client device through the access control of the distributed security system;

allowing distribution of the data stored through the processing node;

in response to determining that the request for the domain does not include the domain authorization data, then:

providing to the client device authentication instructions, in browser-independent instructions, that cause the client device to perform operations comprising:

determining whether the client device has authenticated user data stored in a client data store associated with the client device, as browser-independent data, wherein the authenticated user data is used for validation of the validated user;

in response to determining that the client device has authenticated user data stored in the client data store, sending the request for the domain with the authenticated user data; and in response to determining that the client device does not have authenticated user data stored in the client data store:

generating a login environment through browser-independent instructions, that allows a user of the client device to input login data;

sending the login data input by the user to an authentication process through an authority node that is part of the distributed system and receiving authentication data in response; and storing the authentication data in the client data store; wherein the browser-independent instructions include any of Java scripts, applets, and instructions that instantiate in context of one of the different client browsers and the browser-independent data is used by the browser-independent instructions to generate the domain authorization data.

16. The system of claim 15, wherein the authentication instructions cause the client device to perform further operations comprising:

generating the authenticated user data from the authentication data;

resending the request for the domain to the processing node; and including the authenticated user data with the resent request for the domain.

17. The system of claim 16, wherein the authorization manager causes the processing devices to perform the further operation of:

generating the domain authorization data based on the resent request for the domain and the authenticated user data.

18. The system of claim 17, wherein:
the resent request is an HTTP request and the domain authorization data is included in a cookie associated with the domain, and wherein the authorization manager causes the processing devices to perform operations comprising:

receiving at the processing node a response to the resent request from a host associated with the domain; and providing the response and the HTTP cookie that includes the domain authorization data to the client device.

19. The system of claim 18, wherein:
the client device authentication instructions comprise a flash object;
the authentication data comprise a flash local shared object; and
the authenticated user data comprises an HTTP cookie.

20. The system of claim 19, wherein:
the client device authentication instructions are browser independent and executable by a plurality of different client browsers; and
the authentication data are browser independent and accessible by the client device authentication instructions executed in a plurality of different client browsers.

* * * * *